United States Patent [19]

Shinohara et al.

[11] Patent Number: 4,527,042
[45] Date of Patent: Jul. 2, 1985

[54] METHOD AND APPARATUS FOR VACUUM SEALING A VACUUM CONTAINER ASSEMBLY

[75] Inventors: Hiroshi Shinohara, Nara; Kiyoshi Nagai, Hyogo, both of Japan

[73] Assignee: Taiyo Sanso Co., Ltd., Osaka, Japan

[21] Appl. No.: 504,713

[22] Filed: Jun. 15, 1983

[30] Foreign Application Priority Data

Jun. 21, 1982 [JP] Japan .................. 57-107308

[51] Int. Cl.$^3$ .................................. B23K 27/00
[52] U.S. Cl. ................. 219/121 LC; 219/121 LD; 219/121 EC; 219/121 LY; 219/121 FS; 219/121 EY
[58] Field of Search .............. 219/121 LC, 121 LD, 219/121 LY, 121 FS, 121 EC, 121 ED, 121 EX, 121 EY; 228/221; 445/43, 44; 156/272.8; 220/420, 425; 215/12, 13 R, 13 A

[56] References Cited

U.S. PATENT DOCUMENTS

| | | | |
|---|---|---|---|
| 3,939,880 | 2/1976 | Zook et al. | 219/121 ED X |
| 3,945,186 | 4/1976 | Nakayama et al. | 219/121 LC X |
| 4,251,252 | 2/1981 | Frazier | 228/221 X |

FOREIGN PATENT DOCUMENTS

| | | | |
|---|---|---|---|
| 0073885 | 6/1978 | Japan | 445/44 |
| 57-55875 | 4/1982 | Japan . | |

OTHER PUBLICATIONS

Takei et al., *Journal of Applied Physics,* "Rhenium Film Preparation by Laser Melting", vol. 51, No. 5, May 1980, pp. 2903-2908.

*Primary Examiner*—C. L. Albritton
*Attorney, Agent, or Firm*—Griffin, Branigan & Butler

[57] ABSTRACT

A method and apparatus for vacuum sealing a vacuum container assembly (A) such as a vacuum bottle having an inner container (1b) and an outer container (1a). The vacuum container assembly (A) is heat treated in one location in a vacuum chamber (21) of a vacuum furnace (11) and then moved to a different location in the chamber. At the second location, a sealing plate (4) having a tapered rim (25) is installed into a complementarily tapered guide (2a) at the edge of an evacuation hole (2) in the outer chamber (1a) by a sealing plate fitting device (14). The vacuum container assembly (A) is moved to a third location in the vacuum chamber (21) where the sealing plate (4) is welded to the outer container (1a) by a laser beam (C) which passes into the vacuum chamber (21) from a laser welding device (15) situated outside the vacuum furnace (11) through a beam-transparent window (20) in the wall of the vacuum furnace (11). A transport device (13) having transport segments (13a, 13b, 13c, and 13d) transports the vacuum container assembly (A) from one location to another location inside vacuum chamber (21) of vacuum furnace (11). First and second position regulating devices (16 and 17 respectively) sense the presence of the vacuum container assembly (A) at locations for installing the sealing plate and conducting the laser welding.

2 Claims, 6 Drawing Figures

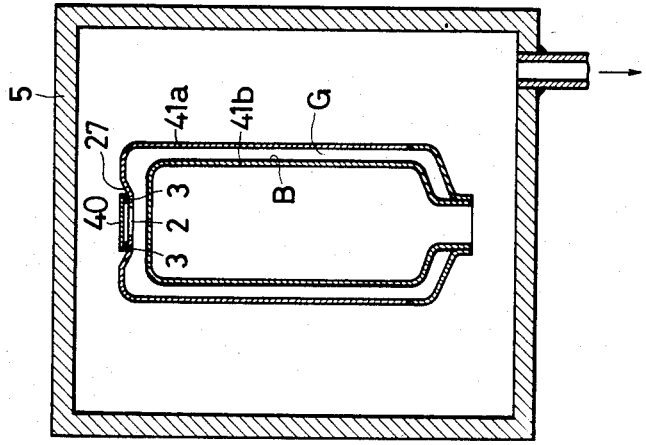
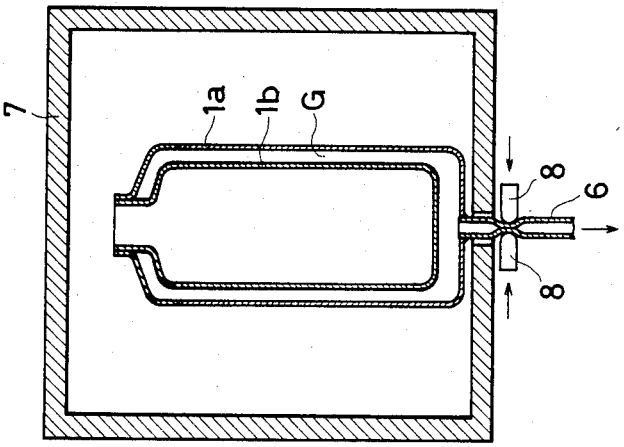

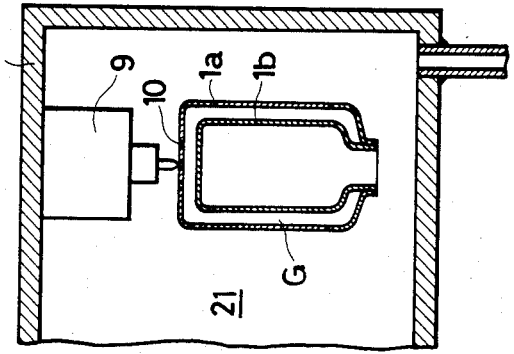
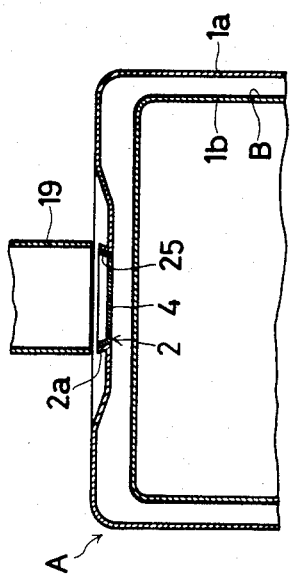
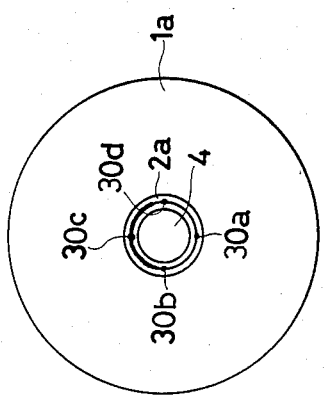

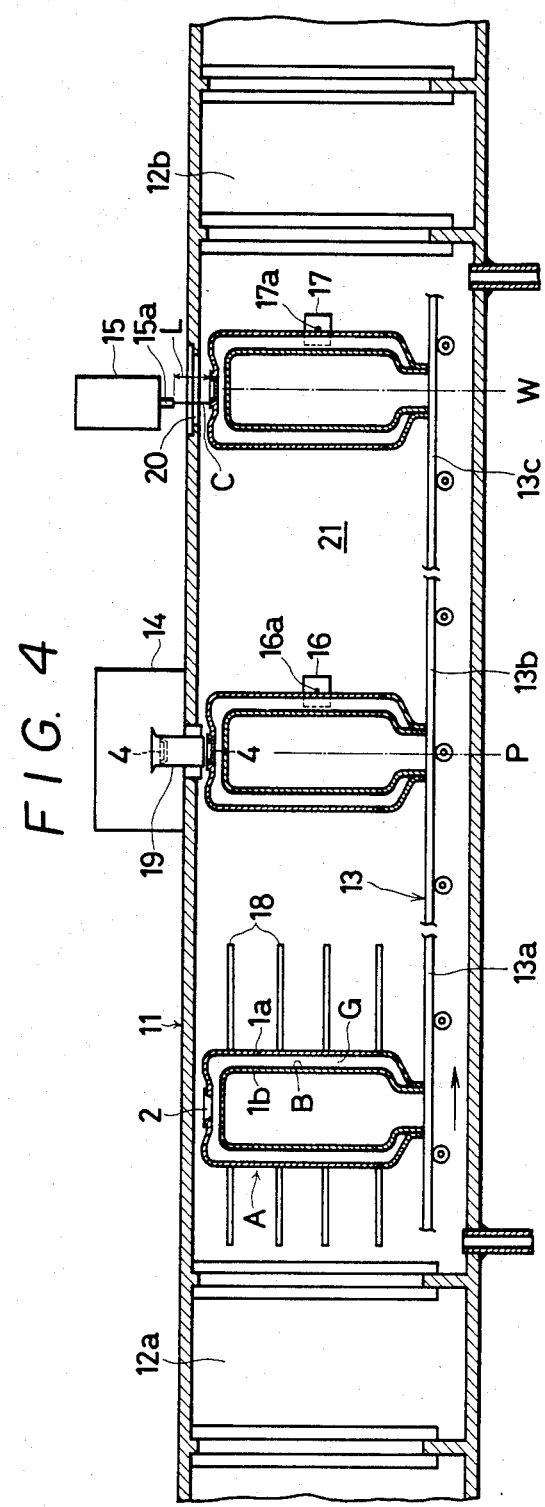

METHOD AND APPARATUS FOR VACUUM SEALING A VACUUM CONTAINER ASSEMBLY

BACKGROUND OF THE INVENTION

The invention relates to a method and apparatus for sealing vacuum insulating containers such as vacuum bottles. More specifically, the invention relates to a method and apparatus for sealing the vacuum insulating containers in a vacuum chamber.

A vacuum insulating container such as a metal vacuum bottle is conventionally sealed under vacuum conditions by one of two prior art methods depicted in prior art FIGS. 1 and 2.

As shown in prior art FIG. 1, a brazing material 3 such as a silver brazing filler metal is placed on the outer edge of an evacuation hole 2 made on the outer container 41a with suitable pitches 27. A sealing plate 40 is set over evacuation hole 2, and the container is then set into a prior art vacuum heating furnace 5. A first stage heat treatment is provided for a fixed time to remove absorbed gases. Next the temperature of the outer container 41a is raised to the melting temperature of the brazing material (800°-1,050° C.) to melt the brazing material so that the sealing plate 40 is brazed with the outer container 41a.

A serious problem associated with the brazing method of sealing the vacuum container is that both the outer container 41a and the inner container 41b are heated up to the melting temperature range of the brazing material (800°-1,050° C.). Because of this high temperature, silver plating, which is the most suitable means to prevent heat loss by radiation cannot be effectively utilized with respect to either the inner or outer containers 41b or 41a. A film of silver plating is damaged by heat at a temperature of approximately 600° C., and the damage resulting from overheating results in a considerable decrease in the ability of the silver plating to prevent radiation.

In the above regard, even if an alternative low melting point solder were substituted for the brazing material 3, a problem would still occur. A stainless steel assembly comprising inner and outer containers 41b and 41a cannot be sufficiently degassed when the melting point of a solder is too low. A result of poor degassing is low welding reliability which makes this method unsuitable for vacuum sealing.

A second prior art vacuum sealing technique is illustrated in prior art FIG. 2 wherein space G is exhausted with a vacuum pump (not illustrated) through an exhaust pipe 6 installed on the bottom of the outer container 41a. Exhaustion of space G is accomplished while the container is inside prior art heating furnace 7. After completion of evacuation, the exhaust pipe 6 is pressure-welded with tools 8a and 8b for vacuum sealing.

A problem associated with the pressure welding technique is that extra insulation of the exhaust pipe 6 on the outer container 41a is required, and this makes the manufacturing process more complicated. The size of the vacuum insulating container becomes larger because of the increase of a dead space since an extra covering case (not illustrated) is required to conceal the projection portions of the exhaust pipe 6.

Accordingly, it is an object of the present invention to provide a method and apparatus for vacuum sealing a vacuum insulating container without damaging silver plating films which prevent radiation heat loss.

Another advantage of the present invention is the provision of a vacuum sealing method and apparatus which precludes the necessity of a vacuum container assembly being heated up to a temperature high enough to damage a silver plating film.

Another advantage of the present invention is the provision of a vacuum sealing apparatus not requiring extra insulation to accommodate an exhaust pipe extending from the vacuum container being sealed.

SUMMARY OF THE INVENTION

An improved method of vacuum sealing a vacuum container assembly having an outer container with at least one evacuation hole and an inner container is provided. In the method, the vacuum container assembly is first heat treated in a vacuum chamber to remove absorbed gases. After heat treatment is completed, welding energy is applied to the rim of the evacuation hole in the vacuum chamber to vacuum seal the hole.

In the preferred embodiment, the welding energy is provided by a laser beam supplied by a laser beam generating device installed on the outside of the vacuum chamber. The laser beam enters the vacuum chamber through a beam-transparent window in the wall of the vacuum chamber.

The welding energy may also be provided in the form of an electron beam supplied by an electron beam welding device installed inside the vacuum chamber.

In addition to the steps of heat treating and laser welding, the preferred method of the invention includes the step of fixing a sealing plate in the evacuation hole of the outer container after the heat treating step is complete. A laser welding beam under vacuum welds the sealing plate to the outer container to form a vacuum-tight seal.

In a further aspect of the invention, in accordance with its objects and purposes, a novel apparatus is provided for vacuum sealing a vacuum container assembly having an outer container with an evacuation hole and an inner container. The novel apparatus is comprised of: a vacuum chamber; a transport device inside the vacuum chamber for moving the vacuum container assembly within the vacuum chamber; a sealing plate fitting device for installing a sealing plate within the evacuation hole; and, a . laser welding apparatus providing a laser beam for welding the sealing plate to the outer container.

The novel apparatus may further include first and second position regulating devices for sensing the presence of the vacuum container assembly at the first position of the sealing plate fitting device and the second position of the laser welding device. The position regulating devices sense the presence of the vacuum container assembly and control the transport device as well.

In the laser welding embodiment of the invention, the vacuum chamber has a transparent wall portion, and the laser welding device is located outside the vacuum chamber. The laser welding device generates a laser beam which is directed through the beam-transparent wall portion and enters the vacuum chamber for welding the sealing plate onto the outer container.

With the method and apparatus of the invention, it is not necessary to heat the vacuum container assembly to a high brazing temperature (800°-1050° C.) to bring about a vacuum seal. Therefore, silver plating for reducing heat loss radiation may be employed in the vacuum container assembly and is not damaged.

By employing the method and apparatus of the invention, a vacuum-tight seal is obtained without employing an external exhaust pipe on the outer container and without necessitating the use of extra insulation for an external exhaust pipe.

BRIEF DESCRIPTION OF THE DRAWINGS

The foregoing and other objects, features, and advantage of the invention will be apparent from the more specific description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a cross-sectional view of a prior art vacuum sealing apparatus employing a brazing technique;

FIG. 2 is a cross-sectional view of a prior art vacuum sealing apparatus employing an external exhaustion tube;

FIG. 3 is a cross-sectional view of an embodiment of the invention depicting electron beam welding;

FIG. 4 is a cross-sectional view of an embodiment of the invention illustrating a laser welding device;

FIG. 5 is an enlarged cross-sectional view of a portion of a vacuum container assembly showing an evacuation hole on which a sealing plate is fitted; and, FIG. 6 is a top view of a vacuum container assembly having a sealing plate installed.

DETAILED DESCRIPTION OF THE INVENTION

Referring to FIG. 4, a vacuum container assembly A is comprised of an outer container 1a and an inner container 1b. A silver plating film B is formed on the exterior surface of the inner container 1b. The silver plating film B prevents heat loss by radiation. Vacuum furnace 11 houses the vacuum container assembly A and has entry and exit ports to a vacuum chamber 21. To help maintain air-tightness in vacuum chamber 21, auxiliarly chambers 12a and 12b are installed on both sides of the vacuum furnace 11. Transport device 13 is inside vacuum chamber 21 and transports vacuum container assembly A inside the vacuum chamber. Sealing plate fitting device 14, laser welding device 15, first position regulating device 16, and second position regulating device 17 are also shown in FIG. 4, and a more detailed description of their operation is provided below.

The degree of vacuum in the vacuum chamber 21 is preferably $10^5$–$10^6$ Torr and is maintained using a vacuum pump or other conventional means (not illustrated). A vacuum container assembly A is conveyed to vacuum furnace 11 through auxiliary chamber 12a (chamber 12a maintains air-tightness on the entrance side) and is transported in the direction of the arrow by one or more conveyor-type transport devices 13 illustrated as segments 13a, 13b, and 13c. Segments 13a, 13b, and 13c may be separate units and may be run at different speeds if desired. The steps of heat treatment, sealing plate fitting, and welding of the sealing plate by a laser beam are performed essentially continuously and substantially simultaneously in the vacuum chamber 21.

In a method for operating the apparatus, a vacuum container assembly A is conveyed to the inside of the vacuum furnace 11 from auxiliarly chamber 12a and is heated up to a temperature of 500°–550° C. by a heater 18 in the furnace. The heating-up constitutes a heat treatment step. During the heat treatment step, gases absorbed on the silver plating film B, both on the exterior surface of the inner container 1b and on the interior surface of the outer container 1a, are exhausted to the outside through the evacuation hole 2. During the heat treatment step, the space G and the vacuum chamber 21 of the furnace 11 are maintained at about the same degree of vacuum.

A vacuum container assembly A that has been heat treated for a suitable time, for example 10–30 minutes, is conveyed by transport device 13 to the sealing plate fitting device 14. During this step, sealing plate 4 is fitted in the evacuation hole 2 on the bottom of the outer container 1a.

The sealing plate fitting device 14 is equipped with a sealing plate feeding mechanism (not shown in detail) which is similar to the so-called auto-loader and is installed on the upper part of the vacuum furnace 11. A sealing plate 4 descends through a guide chute 19 projecting from said fitting device 14 to an opening in the wall of the vacuum furnace. The sealing plate 4 falls into the evacuation hole 2 and is supported by tapered guide 2a of outer container 1a (as shown in FIGS. 5 and 6). Tapered guide 2a is approximately 20–25 mm in diameter. Sealing plate 4 is formed to have a tapered rim 25 which mates with the tapered guide 2a of evacuation hole 2. After the sealing plate 4 descends through the guide chute 19 under the influence of gravity, it is automatically fitted into the hole 2 as tapered rim 25 mates with complementarily tapered guide 2a.

A first position regulation device 16 positions the vacuum container assembly A at the sealing plate fitting position P. In this regard, a sensor 16a detects when the vacuum container assembly body A comes to the prescribed position P and causes transport device segment 13b to stop. First position regulation device 16 then actuates sealing plate fitting device 14.

After a sealing plate 4 is fitted, the vacuum container assembly A is transported to a laser welding position W by a transport device segment 13c. At position W, the sealing plate 4 and the outer container 1a are welded together. More specifically, the tapered guide 2a of the outer container 1a and the tapered rim 25 of the sealing plate 4 are welded together. Welding is accomplished by a laser welding device 15 installed above and outside the vacuum furnace 11. A laser beam C radiates through a beam-transparent glass plate 20 which is a part of the wall of vacuum furnace 11. The laser beam C is directed to the mating region between tapered guide 2a and tapered rim 25.

In one embodiment of the invention, a laser beam C has a pulse duration of 1.0–9.9 milliseconds and a pulse repetition of 200 pps. Output power of 150 w is employed. Other suitable laser welding devices and other suitable operating parameters may also be employed.

FIGS. 5 and 6 illustrate a sealing plate 4 installed in an outer container 1a. When the sealing plate 4 is fitted in the evacuation hole 2, spot welding is performed at four spots 30a, 30b, 30c, and 30d by moving a laser gun 15a (in FIG. 4). Next the laser gun 15a is moved in a circle along the mating line for further welding. The distance L between a welded surface and the tip of the laser gun 15a is approximately 10–15 mm. Due to the narrowness of the laser beam, an extremely narrow welding line becomes possible.

The laser welding position W is regulated by a second position regulating device 17 having sensor 17a which detects when the vacuum container assembly A comes to the prescribed position W and causes transport device segment 13c to stop. Second position regulating device 17 then actuates laser welding device 15.

Time required for a laser welding is approximately 20-30 seconds per vacuum container assembly A. The speed of each transport device segments 13a, 13b, and 13c is regulated to permit the appropriate welding time. In one embodiment of the invention, the transport device segment 13b for the sealing plate fitting step and the transport device segment 13c for the welding step are set at the same speed. A plurality of parallel transport device segments 13a, set at a slower rate for the heat treatment step, feed container assemblies in timed relation onto transport device segment 13b.

With reference to FIG. 3, another embodiment of the invention is disclosed in which an electron beam welding machine 9 is provided inside vacuum chamber 21 of vacuum furnace 11. In this embodiment, a plurality of small evacuation holes 10 approximately 0.3 mm-1.0 mm in diameter are on the bottom of outer container 1a. After space G is evacuated, and after a heat-treatment step is completed, small holes 10 are electron beam welded and provide a vacuum-tight seal.

By employing the embodiment of the invention illustrated in FIG. 3, the small evacuation holes 10 are sealed without the need to heat up outer container 1a to a high temperature. Thus, a silver plating film is not damaged, and at the same time an excellent air-tight vacuum seal is obtained.

When the electron beam welding machine 9 is employed, control devices (not illustrated) for the welding machine are installed outside vacuum furnace 11, and a vacuum tight seal is maintained between the welding control devices and the electron beam generating device inside vacuum furnace 11.

By employing the method and apparatus of the invention, a highly accurate vacuum sealing welding is obtained without heating up silver plating films on the inner and outer containers of a vacuum container assembly. Application and preservation of the silver plating films are desired for their property of reducing heat loss by radiation. The thermal insulating properties of the space G in a vacuum container assembly A made in accordance with the principles of the invention are remarkably improved over the thermal insulating characteristics of an insulating space provided by a conventional method of vacuum sealing such as illustrated in FIG. 1. For example, the temperature of a previously boiled water sample initally measured at 95° C. goes down to 62° C. with a vacuum container assembly made by the conventional method illustrated in FIG. 1 after 24 hours has elapsed. In contrast, by employing a vacuum container assembly made in accordance with the principles of the invention, during a 24 hour period, the water initially at 95° C. goes down to a temperature of 65° C. That is, the temperature maintaining properties are improved by 3° C. over a 24 hour period by employing the principles of the present invention.

The foregoing description of the novel method and apparatus of the invention has been presented for purposes of illustration and description. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The embodiments of the invention in which an exclusive property right or privilege is claimed are defined by the following:

1. An apparatus for sealing a vacuum container assembly having an outer container with an evacuation hole and an inner container, comprising:
   a vacuum chamber means;
   heating means for heating the vacuum container assembly in said vacuum chamber;
   sealing plate fitting means for installing a sealing plate within the evacuation hole;
   welding energy application means for welding the sealing plate to the outer container;
   first position regulating means for sensing the presence of a vacuum container assembly at said sealing plate fitting means and for controlling the movement of said transport means; and
   second position regulating means for sensing the position of a vacuum container assembly at said welding energy application means and for controlling the movement of said transport means.

2. An apparatus for sealing a vacuum container assembly having an outer container with an evacuation hole and an inner container, comprising:
   a vacuum chamber means;
   heating means for heating the vacuum container assembly in said vacuum chamber;
   sealing plate fitting means for installing a sealing plate within the evacuation hole;
   welding energy application means for welding the sealing plate to the outer container;
   wherein said welding energy application means comprise laser welding means located outside of said vacuum chamber, and wherein said vacuum chamber has a trasparent wall poriton through which a beam from said laser welding means passes for welding the sealing plate to the outer container in said vacuum chamber.

* * * * *